(12) United States Patent
Grunert et al.

(10) Patent No.: US 7,132,644 B2
(45) Date of Patent: Nov. 7, 2006

(54) PHOTO SENSOR FOR STANDARDIZED COLOR MEASUREMENT

(75) Inventors: Fred Grunert, Bad Klosterlausnitz (DE); Frank Krumbein, Windischholzhausen (DE); Gunter Siess, Kraftsdorf (DE)

(73) Assignee: MAZeT GmbH, Jena (DE)

( * ) Notice: Subject to any disclaimer, the term of this patent is extended or adjusted under 35 U.S.C. 154(b) by 0 days.

(21) Appl. No.: 10/783,079

(22) Filed: Feb. 20, 2004

(65) Prior Publication Data

US 2005/0072908 A1    Apr. 7, 2005

(30) Foreign Application Priority Data

Oct. 2, 2003   (DE) ................................ 103 46 595

(51) Int. Cl.
    *H01J 40/14*   (2006.01)
(52) U.S. Cl. ........................ 250/226; 356/406
(58) Field of Classification Search ................ 250/226, 250/239, 208.1, 229, 214 P, 214 PR; 356/405, 356/406; 348/308
See application file for complete search history.

(56) References Cited

U.S. PATENT DOCUMENTS

| | | | |
|---|---|---|---|
| 3,996,461 A | | 12/1976 | Sulzbach et al. .............. 430/7 |
| 4,562,356 A | * | 12/1985 | Auth ....................... 250/458.1 |
| 5,246,803 A | * | 9/1993 | Hanrahan ..................... 430/7 |
| 5,272,518 A | * | 12/1993 | Vincent ....................... 356/405 |
| 5,680,220 A | * | 10/1997 | Delignieres .................. 356/406 |
| 6,133,954 A | * | 10/2000 | Jie .............................. 348/308 |
| 6,707,556 B1 | * | 3/2004 | Turner ........................ 356/436 |

* cited by examiner

*Primary Examiner*—Thanh X. Luu
*Assistant Examiner*—Tony Ko
(74) *Attorney, Agent, or Firm*—Reed Smith LLP

(57) ABSTRACT

The invention is directed to a photosensor for color measurement based on three spectral components, particularly for highly accurate color measurement for testing and guaranteeing color constancy in engineered surfaces and consumer articles of any kind. The object of the invention, to find a novel possibility for color measurement based on a three-range method with color measurement values generated by preceding interference filters with different spectral responses which permits a virtually true-color measurement in conformity with standards in a simple manner without costly reference light calibration, is met according to the invention in that the photosensor comprises at least three partial surfaces which are covered by different interference filters adapted to the X-, Y- and Z-spectral characteristic of the human eye, each partial surface being arranged so as to be uniformly distributed in a sector-shaped manner and so as to cover the same area around a center with passivated webs located therebetween, and every partial surface is provided with an interference filter whose transmission characteristic over the wavelength of the light to be measured spectrally is adapted to the response of the human eye, wherein the spectral components passed by the interference filters approximate the normal spectral value functions of the human eye in color coordinates of the color space.

16 Claims, 12 Drawing Sheets

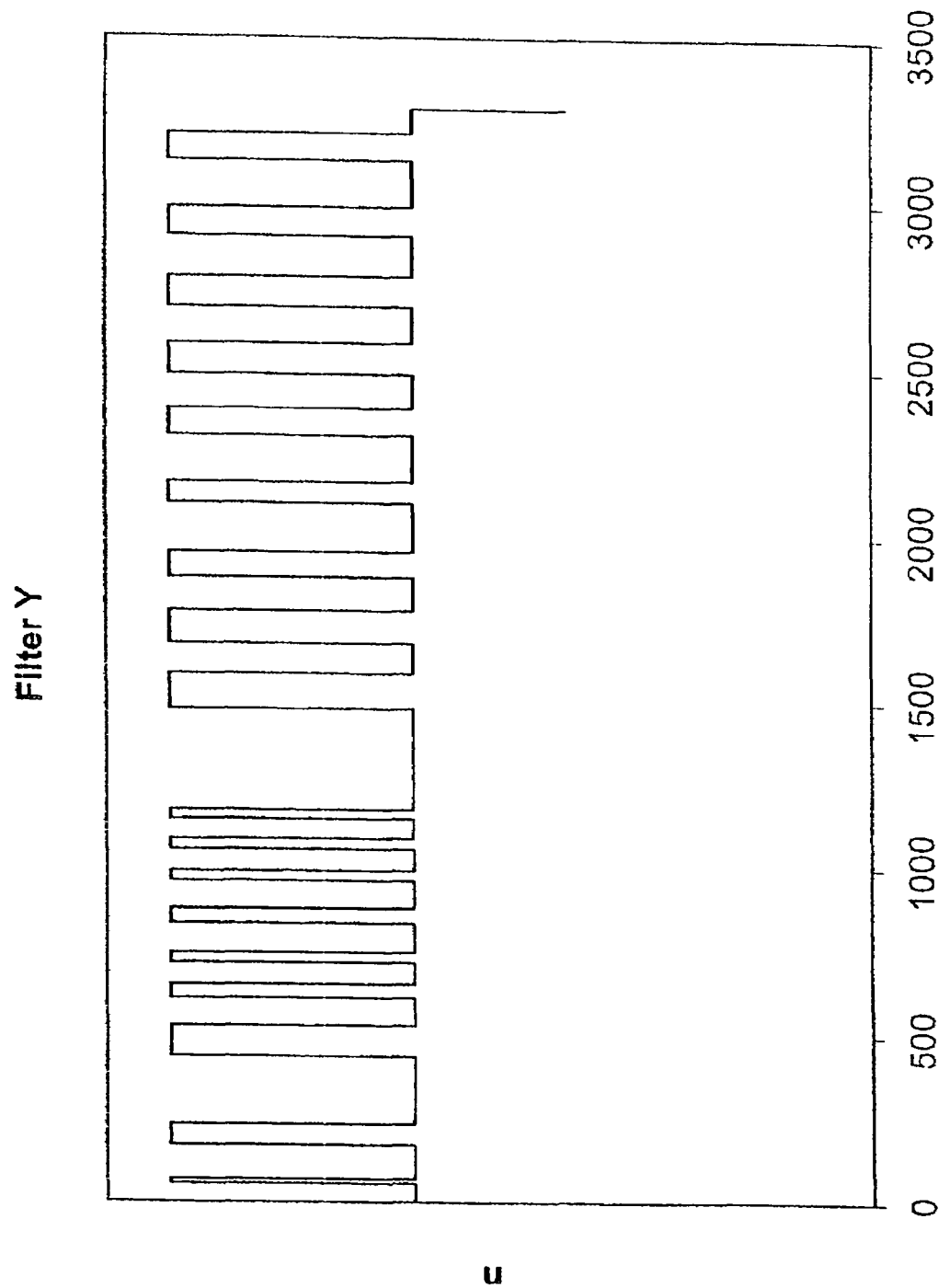

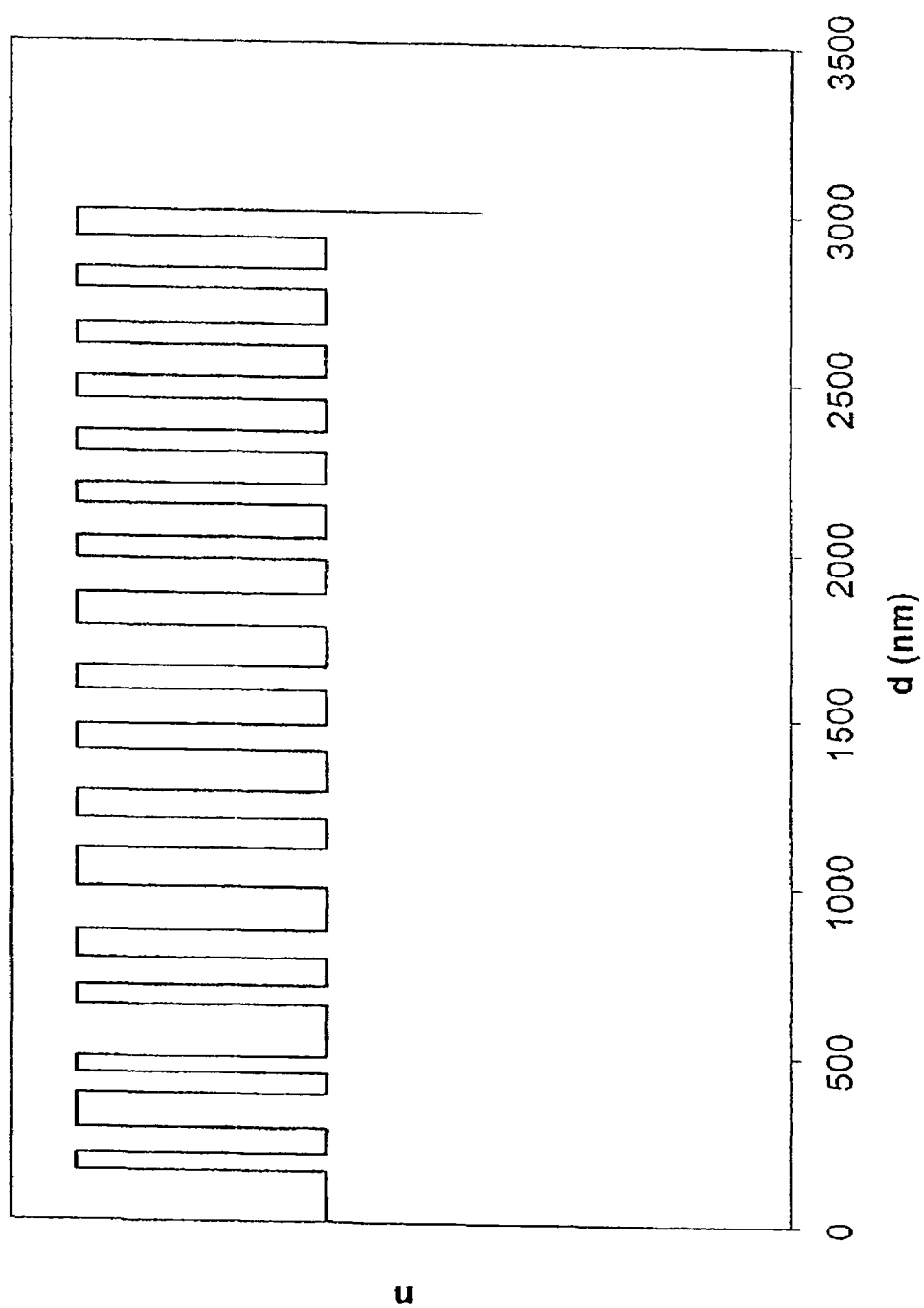

PHOTO SENSOR FOR STANDARDIZED COLOR MEASUREMENT

CROSS-REFERENCE TO RELATED APPLICATION

This application claims priority of German Application No. 103 46 595.2, filed Oct. 2, 2003, the complete disclosure of which is hereby incorporated by reference.

BACKGROUND OF THE INVENTION

1. Field of the Invention

The invention is directed to a photosensor for color measurement based on three spectral components, the sensor chip having three partial surfaces of different sensitivity for detecting the three spectral components through a preceding interference filter structure. The partial surfaces provide measurement values which are converted into color values in a suitable color space, particularly for highly accurate color measurement (point measurement) for testing and guaranteeing color constancy in engineered surfaces and consumer articles of any kind.

2. Description of the Related Art

Over the course of general technical/technological development, requirements for simple individual color sensors, color sensor arrays and color cameras have also increased sharply. This is the result of heightened expectations with regard to design (chiefly color constancy) of industrial products and consumer articles on the one hand and of the steadily increasing demands on quality in man-machine communications on the other hand. The latter branch of technology in particular is characterized by steadily increasing demands of modem media in general and e-commerce in particular and must deliver satisfactory results in a wide variety of display systems and printer systems. For this reason, the push for standardized color measurement (true color) in different application-specific requirements for accuracy continues to increase.

In principle, three different methods for color measurement are known:
 comparison methods,
 spectral methods, and
 tristimulus or three-range methods.

For reasons of expenditure and cost, the three-range method is relied upon principally, although it has substantial limitations due to the fact that it results in wavelength-integral color values which are valid only for the illumination used. For example, metamerism indices can only be determined through a series of measurements with different illuminations (reference illuminant and test illuminant) which must always be physically present.

The underlying principle of a spectrally adapted semiconductor sensor is already known from U.S. Pat. No. 3,996,461 which describes an optical thin-film filter based on a multilayer interference system for a silicon photosensor for limiting the sensitivity or response of the sensor to the spectral response of the human eye. The interference filter comprises an alternating layer system of pure quarter-wave layers for the wavelengths $\lambda=550$ nm, 780 nm and 1000 nm. The high-refraction layers are made of titanium oxide and the low-refraction layers are made of silicon oxide. The resulting filter system corresponds to a Y-characteristic of the spectral response curve of the human eye without the possibility of a spectrally selective resolution of the color spectrum in the sense of a correlation of color values or standard spectral colors, since the filter layers are not structured but rather are applied to a plurality of sensor elements at the same time.

U.S. Pat. No. 5,246,803 discloses structured or patterned dichroic filters for solid state electronic image sensors which are carried out by alternating deposition on the sensor surface or on a glass layer. The description refers to the alternating deposition of $SiO_2$ layers and $TiO_2$ layers under vacuum conditions and low temperature for generating color filters. The spectral characteristic of the filters is controlled through the quantity and thickness of the layers and the shaping and deposition of the layers is repeated as often as necessary to generate red filters, green filters and blue filters. According to U.S. Pat. No. 5,246,803, for example, in an alternating layer filter stack for the blue filter, a pass region ("on-band region" with approximately 80% transmission) of 400–500 nm is generated, while the reflection region ("off-band region" with less than 5% transmission) is between 500 and 700 nm.

This solution is disadvantageous in that it involves pure bandpass or edge filters, so that point measurements with narrowband color stimuli in the off-band region of the color filters regularly lead to the measurement of falsified color values or require a special reference light calibration.

OBJECT AND SUMMARY OF THE INVENTION

It is the primary object of the invention to find a novel possibility for color measurement based on a three-range method with three color measurement values generated by preceding interference filters with different spectral selectivity which permits a virtually true-color measurement in conformity with standards in a simple manner without costly reference light calibration.

According to the invention, in a photosensor for color measurement based on three spectral components, a sensor chip having at least three partial surfaces of different sensitivity for detecting the three spectral components through a preceding interference filter structure, wherein the interference filter structure contains three different alternating layer systems of silicon dioxide and titanium dioxide for selective transmission of incident light into the different partial surfaces of the sensor chip and the partial surfaces provide measurement values, the stated object of the invention is met in that the photosensor has three partial surfaces which are covered by different interference filters adapted to the spectral characteristic of the human eye, each partial surface being arranged so as to be distributed in a sector-shaped manner around a central point with passive webs located therebetween, and in that the transmission characteristic of each interference filter over the wavelength of the light to be measured spectrally is adapted to the response of the human eye in such a way that the product of the base sensitivity of the partial surfaces of the photosensor and the transmission of the interference filter is proportional to the normal spectral value curve of the human eye for the relevant coordinate of the color space, so that the passed spectral components generate measurement values in the partial surfaces, which measurement values can be converted into spectral color values with simple scaling relative to one another in the color space.

Since the product of the base sensitivity of the photosensor (photodiode) and the transmission characteristic of every interference filter is proportional to the normal spectral value curve of the human eye for the relevant coordinate of the color space, the spectral response of the photosensor according to the invention corresponds almost exactly to the color perception of the human eye and makes possible the separation of color differences with the same quality as or better quality than the human eye.

In technological implementation of an interference filter which is ideally adapted as a computer-simulated alternating layer system (with alternating layers of $TiO_2$ and $SiO_2$ of different thickness) for the respective color coordinate in the color space, the transmission characteristic of each interference filter is advisably produced with a tolerance of the layer thicknesses of less than 2%.

Since achieving appreciably smaller layer thickness tolerances (say, of less than 1%) is currently unrealistic from a technological standpoint, a linear correction of the measurement values given by the partial surfaces is carried out—insofar as this is required for the accuracy of the color measurement for the desired application. This can be accomplished by a non-local or global matrixing for correcting the output measurement values for the entire color space on the one hand and—in case of higher accuracy requirements, e.g., for output of exact tristimulus values—by linear correction of the output measurement values by means of local matrixing of suitable tetrahedral areas of the color space on the other hand.

In order to realize a compact construction of the color sensor, the interference filters are advantageously arranged directly on the semiconductor diodes of the sensor chip. The interference filters are preferably arranged directly on silicon diodes of the sensor chip for this purpose. For this purpose, the Si diodes are best produced by a PIN diode technique specially adapted to the visual spectral region in order to achieve an advantageous base sensitivity of the Si diodes of the entire sensor chip. In this case, there is a special added advantage in that the aging and temperature dependency of the entire system of photodiodes and interference filters are negligible. Further, it is even possible to convert the photocurrents as readout color measurement values directly into a standardized color space for certain classes of accuracy.

The interference filters can also advisably be arranged on Si diodes which have been produced by CMOS technology that is adapted to the visual spectral region.

Further, the interference filters can also be arranged on a sensor chip with germanium diodes or with diodes based on InGaAs.

With regard to the technological aspects of the layer thickness tolerances to be met, i.e., in order not to waste the entire sensor chip when tolerances are exceeded, the interference filters over the Si diodes (partial surfaces) of the sensor chip can also advantageously be arranged on a separate glass plate or can also be inserted by applying lift-off techniques.

For measurements of reflectance on surfaces in which there is a uniform illumination of the photosensor, the partial surfaces on the sensor chip which have different sensitivities because of the interference filters arranged on them are preferably shaped as segments of a circle (thirds of a circle area) and are arranged in a uniformly distributed manner around a central point.

In another arrangement by which the spectral characteristics of the partial surfaces of the photosensor can be scaled to the response distribution of the eye at least partially with resect to hardware, partial surfaces on the sensor chip which are covered by the adapted interference filters and have different sensitivities are arranged around a central point as sectors of a circle area with different surface contents, wherein the different surface contents are adapted in such a way that a lower base sensitivity of one partial surface which comes about because of limited wavelength transmission of the respective interference filter is compensated by a correspondingly greater surface content of the partial surface of the photosensor.

In another advisable shape of the partial surfaces of the photosensor, the partial surfaces coated with different interference filters are arranged in a uniformly distributed manner around a central point in the shape of rhombuses with a 120-degree angle, so that they form a regular hexagon as a tricolor segment.

These hexagonal tricolor segments can advantageously be arranged on the sensor chip so as to be uniformly distributed around a plurality of central points with identical webs, so that the tricolor segments form a honeycomb pattern, wherein partial surfaces having identical spectral response do not share any adjacent lateral edges.

By means of the photosensor according to the invention it is possible to realize color measurements based on a three-range method with three color measurement values which are generated by interference filters with different spectral selectivity which permit a virtually standardized true color measurement by means of interference filters adapted to the normal spectral function of the human eye without costly reference light calibration. As a result, color differences can be separated with a quality comparable to the human eye. Further, the measured photocurrents of the three partial surfaces of the sensor can be converted directly into standardized color spaces for certain classes of color measurement accuracy. Inexpensive color sensors can be realized with the invention and can be integrated into efficient compact color measurement devices.

The invention will be described more fully in the following with reference to embodiment examples.

BRIEF DESCRIPTION OF THE DRAWINGS

In the drawings:

FIG. 7b shows an optimized $SiO_2/TiO_2$ interference filter for the adapted green response function of the photosensor (Y-coordinate in the color space);

FIG. 7c shows an optimized $SiO_2/TiO_2$ interference filter for the adapted blue response function of the photosensor (Z-coordinate in the color space);

FIG. 8b shows the maximum value of ΔE over all centroid wavelengths as a function of the filter curve displacement of the model target according to FIG. 8a;

FIG. 8c shows the total results of the error calculation as a function of the centroid wavelength and of the displacement of the filter function of the model target according to FIG. 8a;

FIG. 9b shows the maximum value of ΔE over all centroid wavelengths as a function of the filter curve displacement of the model target according to FIG. 9a;

FIG. 9c shows the total results of the error calculation as a function of the centroid wavelength and of the displacement of the filter function of the model target according to FIG. 9a;

FIG. 11c shows the total results of the error calculation with displacement of the X-filter function for targets according to FIG. 11a;

DESCRIPTION OF THE PREFERRED EMBODIMENTS

Figure 1:
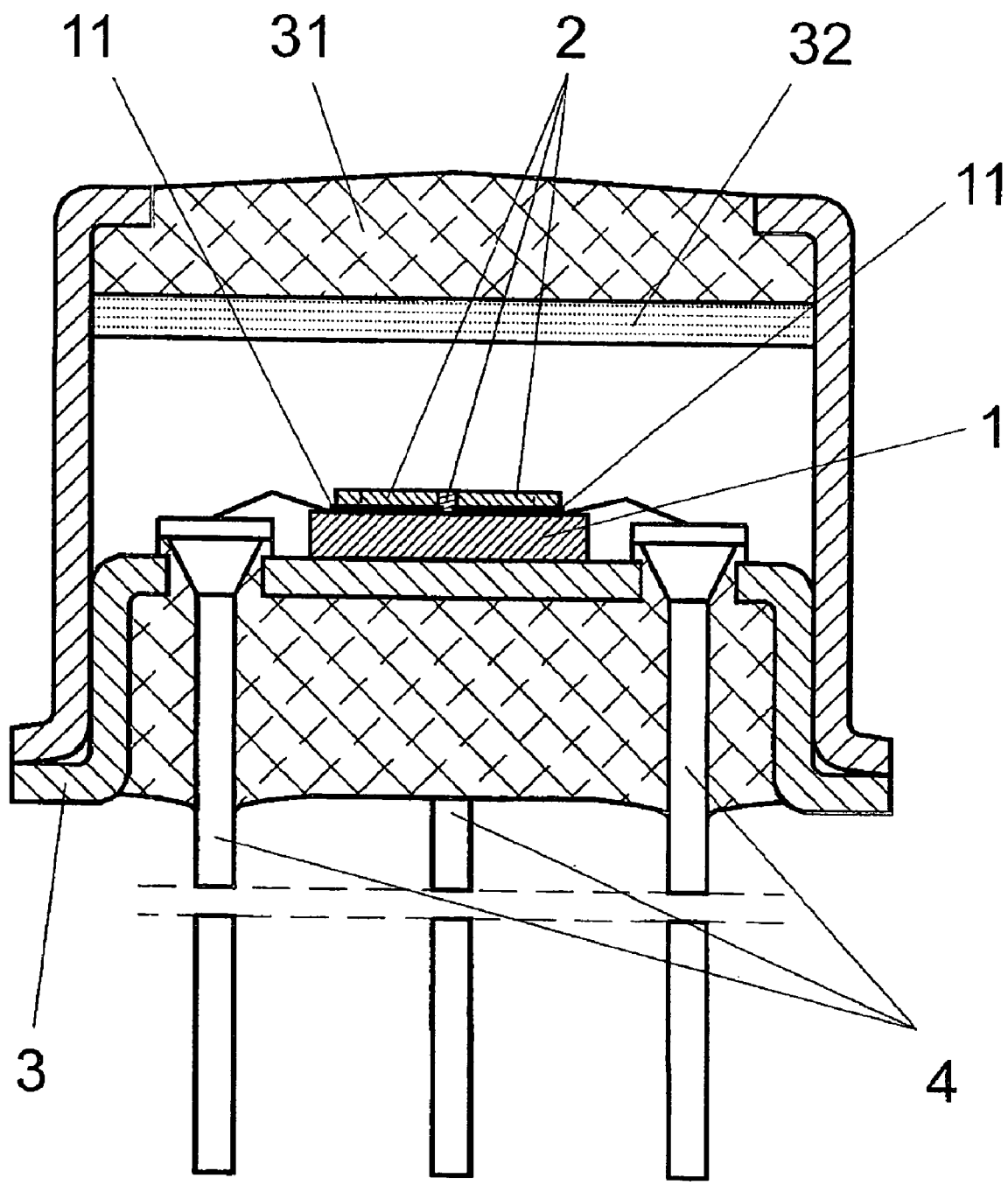
FIG. 1 is a schematic sectional view showing an arrangement of the photosensor according to the invention for color measurement.

In its basic construction, as is shown schematically in FIG. 1, the color sensor according to the invention comprises a sensor chip 1 with photosensitive partial surfaces 11 and an interference filter structure 2 with interference filters 21, 22 and 23 (shown only in FIGS. 5 and 6) with different spectral sensitivities or responses, a housing 3 with an inlet window 31 and an infrared filter layer 32 provided thereon, and connection electrodes 4.

Figure 2:
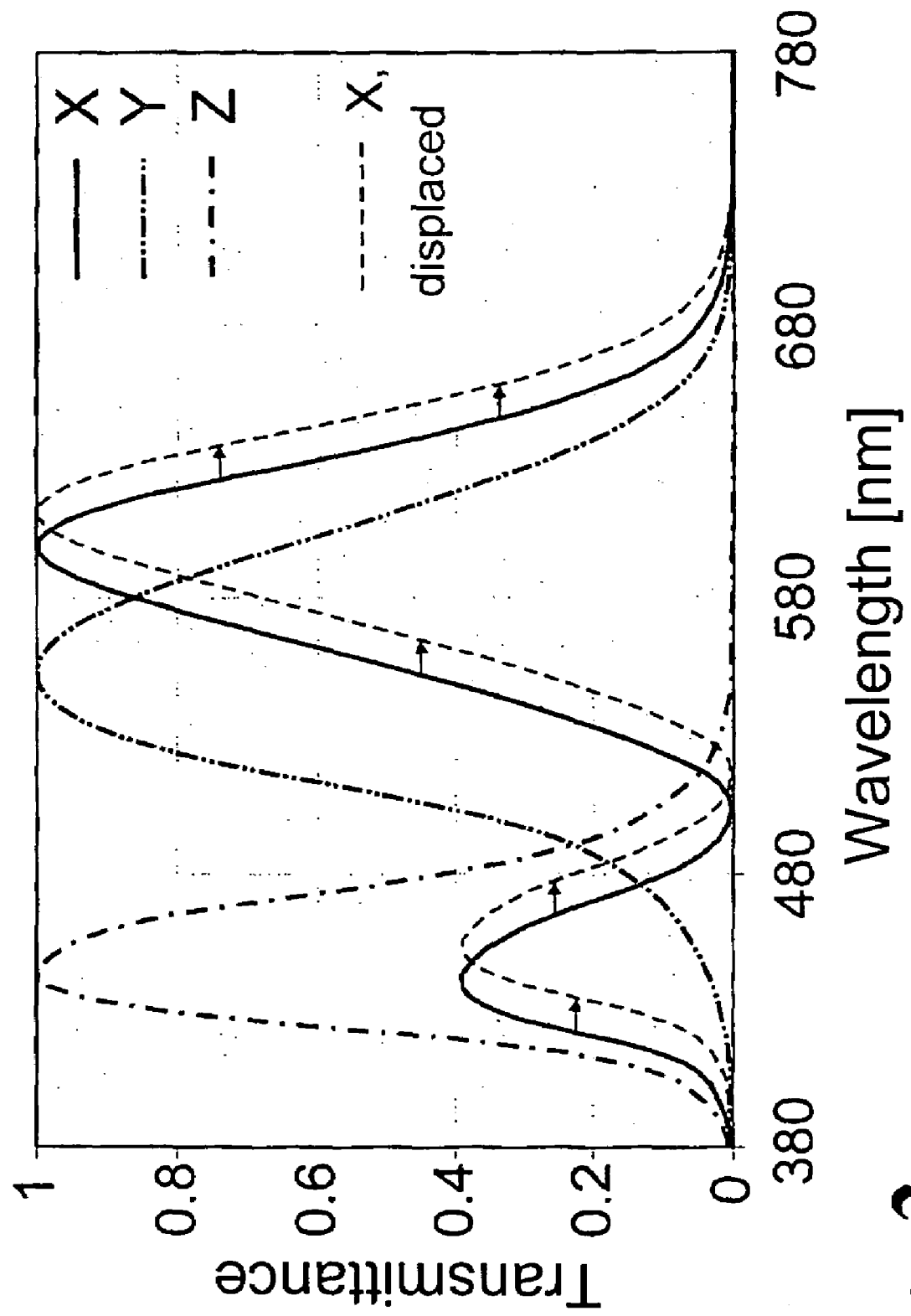
FIG. 2 shows a basic view of the transmission functions of the three-filter system, according to the invention, for the different coordinates in the CIE color space as an adaptation to the normal spectral value function of the human eye.

The interference filter system 2 has three alternating layer systems of different dimensions as a triple element comprising silicon dioxide layers and titanium dioxide layers whose spectral transmission is adapted to the normal spectral functions of the human eye. FIG. 2 shows the standardized normal spectral functions of the interference filters 21, 22 and 23 for the respective coordinate of the selected CIE color space.

The spectral transmission of the interference filters 21, 22 and 23 is dimensioned in such a way that the product of the base sensitivity S (shown in FIG. 3 for Si diodes produced by PIN technology) and transmission characteristic of the respective interference filter 21, 22 or 23 is proportional to the desired normal spectral value curve. Accordingly, the product of the base sensitivity S and filter transmission X, Y, Z is always used as the total spectral response of the color sensor as is shown in FIG. 4 for a specific case (based on FIG. 3).

Figure 3:
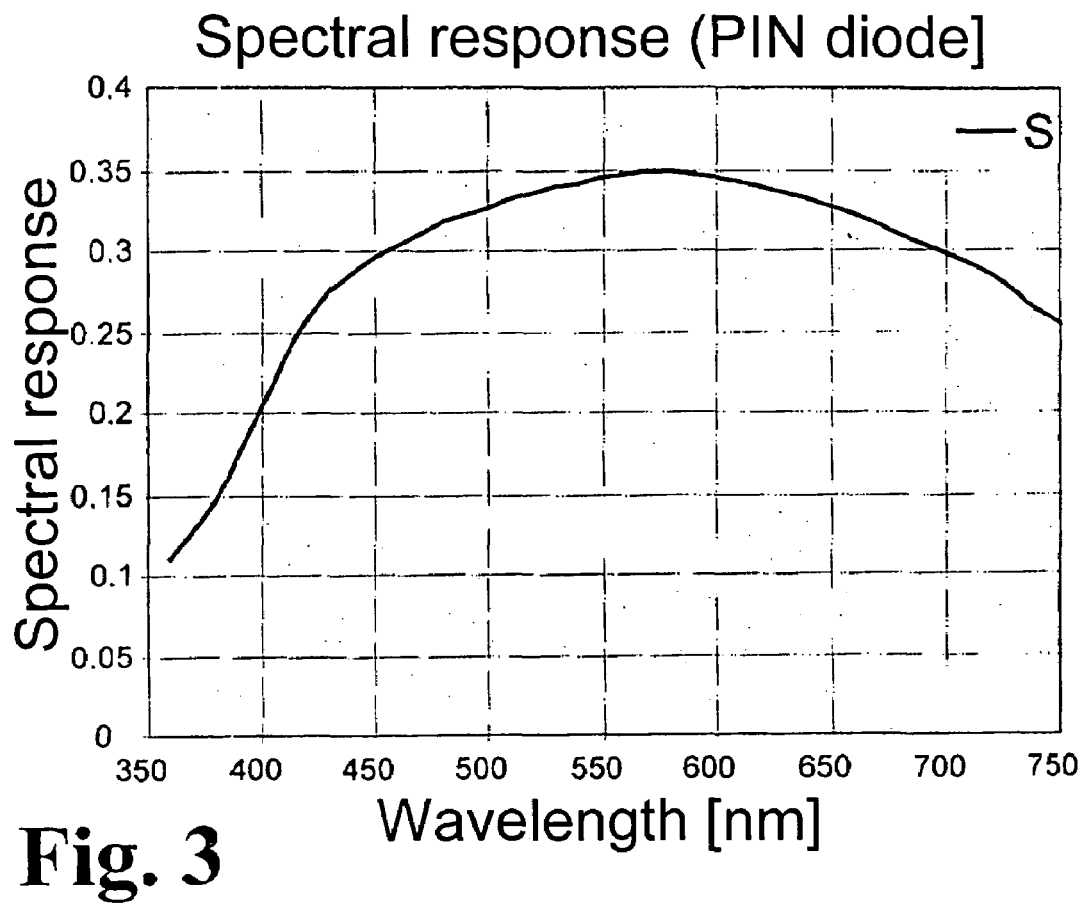
FIG. 3 is a graph of the base sensitivity of the sensor material.

In the following, it is assumed—without limiting generality—that the base material of the sensor chip 1 is outfitted with Si diodes which were produced by PIN diode technology specially adapted to the visual spectral region and their spectral response accordingly best approximates that of the human eye. The response curve of a PIN diode fabricated in this way is shown in FIG. 3. With a similarly shaped base sensitivity S, Ge diodes or InGaAs diodes can also be used instead of Si diodes.

Figure 4:
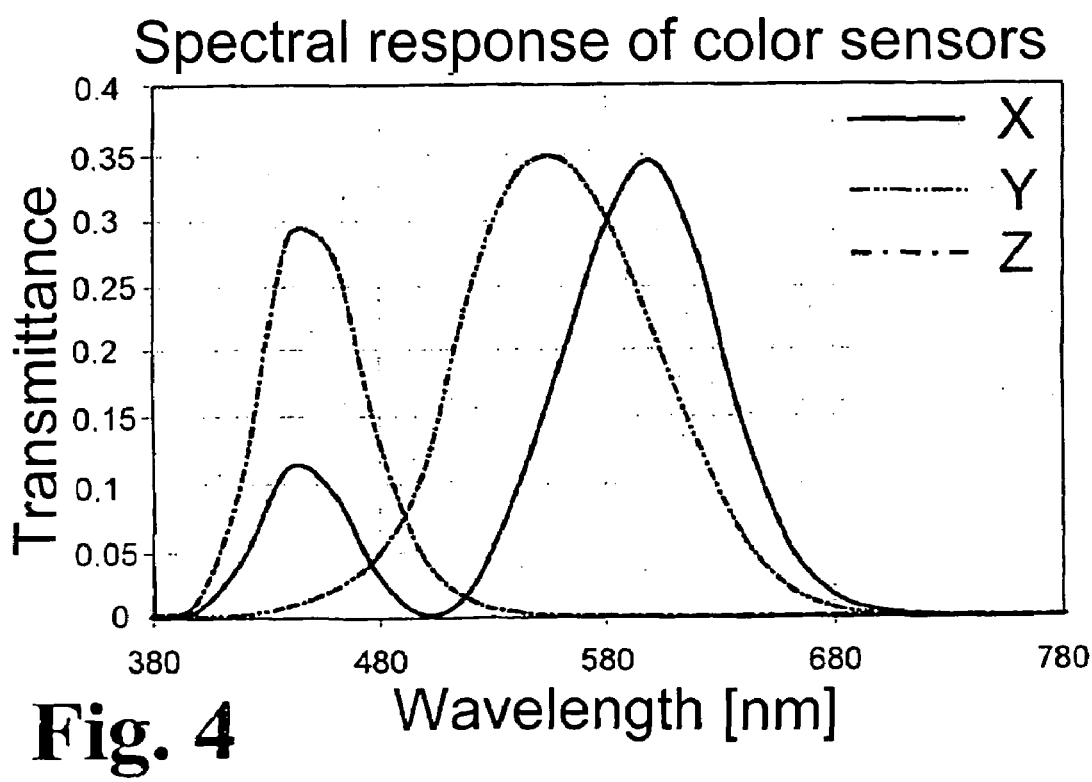
FIG. 4 shows the ideal transmittance of the interference filters taking into account the base sensitivity of the photosensor.

FIG. 4 shows the total spectral response distribution of the color sensor when the interference filter structure 2 with its three different interference filters 21, 22 and 23 for the X-, Y- and Z-components is arranged on a sensor chip 1 according to the response function of FIG. 3 (e.g., based on PIN diodes). In order to obtain the resulting transmission curves of the color sensor (shown in FIG. 4) in the three coordinates of the color space, the interference filters 21, 22 and 23 must be varied in a suitable manner with respect to the layer thicknesses of the alternating layers. A related system of interference filters 21, 22, 23 which is optimized in this way is indicated, e.g., in FIGS. 7a (X-filter), 7b (Y-filter) and 7c (Z-filter), for the coordinates of the color space.

Figure 5:
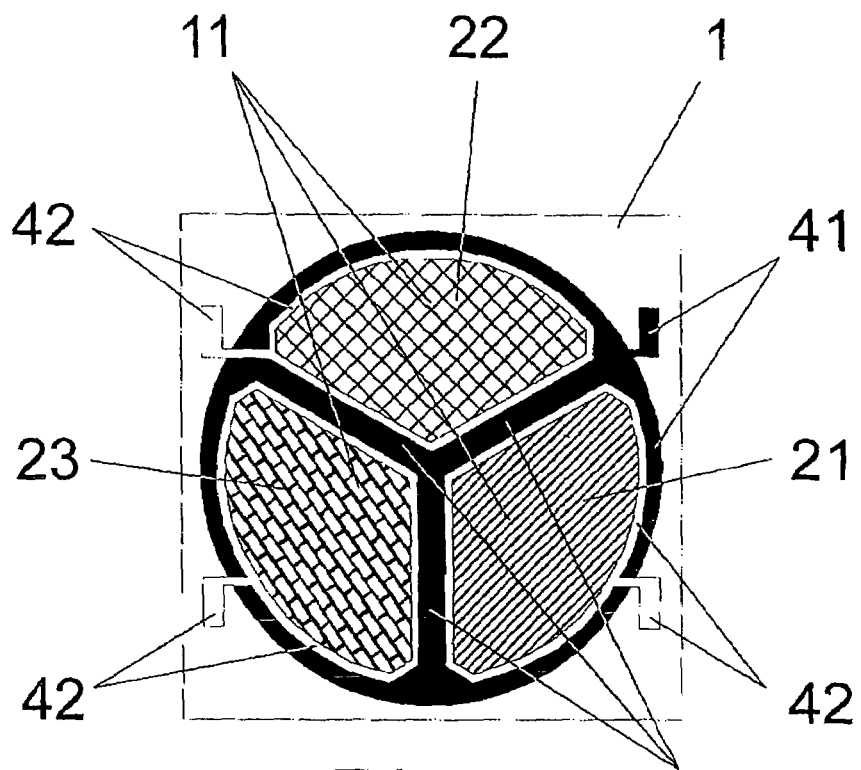
FIG. 5 shows a first variant of the color sensor according to the invention (top view) as an individual sensor with three partial surface having different responses due to the different interference filter functions.

FIG. 5 shows a variant of the sensor chip 1 for a color sensor capable of point measurement. The black area is the cathode 41 of the entire triple element of the color sensor. The white areas are the anodes 42 of the three partial surfaces 11 of the photosensor from which the occurring photocurrents are derived as measurement values. In the selected case, the striped partial surface 11 should have the X-transmission function (according to FIG. 2) generated by interference filter 21, while the partial surface filled in with squares and the partial surface 11 with the brick-shaped pattern represent, respectively, the Y- and Z-transmission functions of the interference filters 22 and 23 (according to FIG. 2).

Figure 6:
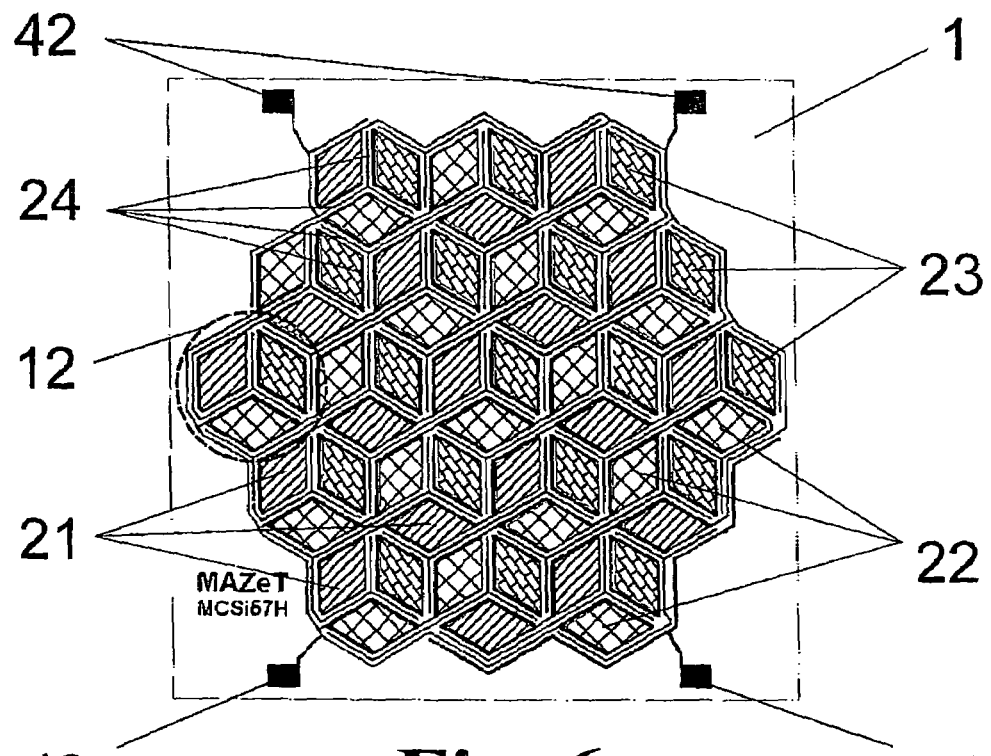
FIG. 6 shows a second arrangement of the color sensor according to the invention as a multi-element sensor with a plurality of tricolor elements in a honeycomb pattern.

A special arrangement of the color sensor according to the invention for area color measurements is shown in FIG. 6 in a top view of the sensor chip 1. In this case, the sensor chip 1 has a plurality of honeycomb-shaped triple elements 12, each of which comprises three Si diodes with the different interference filters 21, 22 and 23. The triple elements 12 are arranged relative to one another in such a way that an interference filter 21, 22 or 23 has no shared edge with the same interference filter 21, 22 or 23 of each of the adjacent triple elements 12. This results in a uniform structure on the whole sensor chip 1 which is capable of carrying out a measurement of the uniformity of a color sensation of a surface.

Figure 7A:
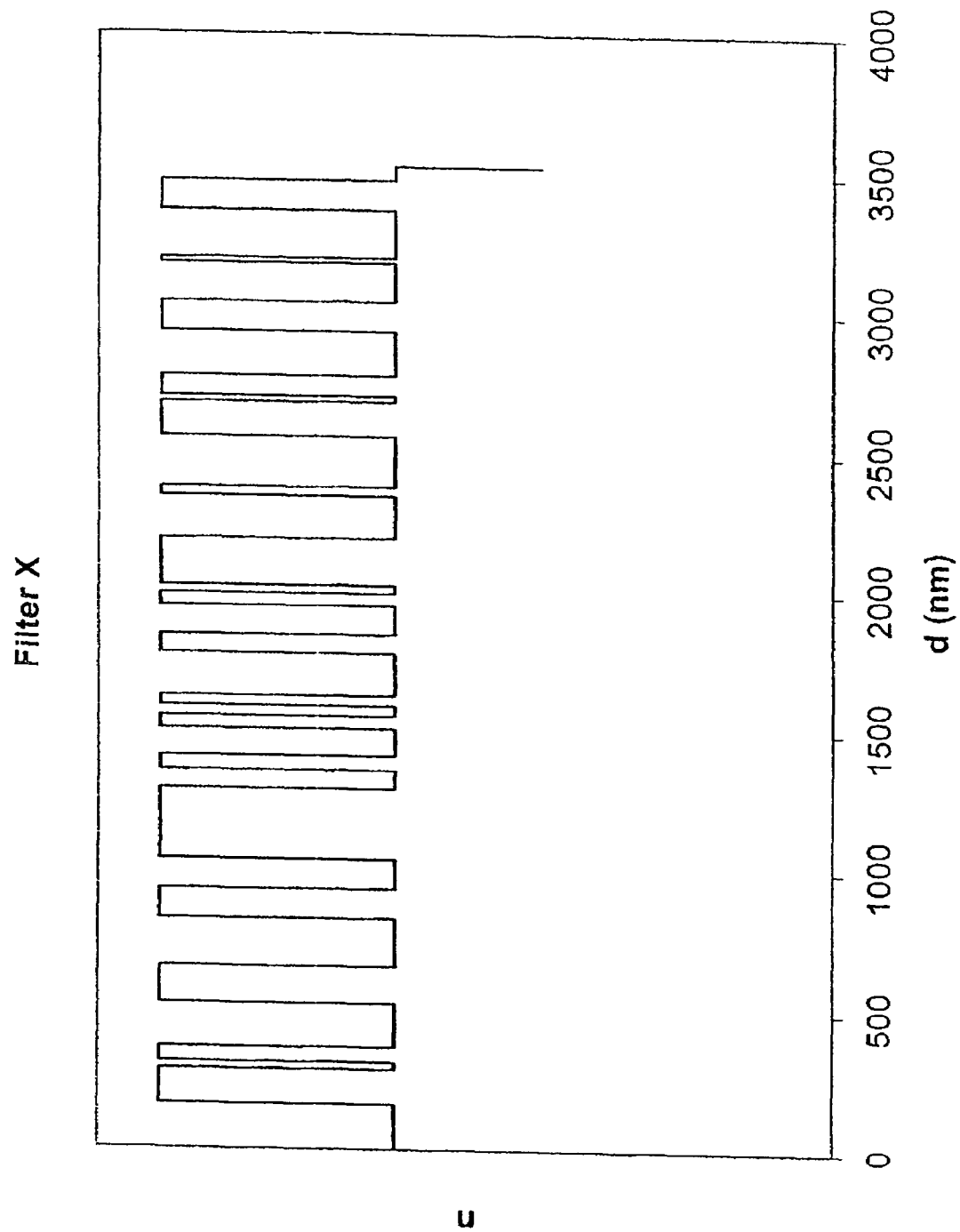
FIG. 7a shows an optimized interference filter comprising an alternating layer system of $SiO_2$ and $TiO_2$ for the adapted red response function of the photosensor as X-coordinate of the color space.

As can be seen from FIG. 7a, the sequence of alternating layers of the alternating layer system of the X-filter of the color sensor (partial surface 11 for the spectral function of the red response of the human eye to be adapted) is particularly changeable with respect to the layer thicknesses. This is because of the equally complicated curve of the spectral transmission function to be approximated, which was adjusted according to the solid line for the X-coordinate of the color space in FIG. 2. The interference filter 22 indicated in FIG. 7b as alternating layer system for the Y-filter of the color sensor is designed in a somewhat more regular manner and is associated with the green color perception of the human eye. In contrast, the interference filter 23 conveys an almost regular structure of the alternating layer system of $SiO_2$ and $TiO_2$ for the blue color "perception" of the color sensor approximated by the Z-filter indicated in FIG. 7c. The entire filter structure 2 of interference filters 21, 22 and 23 was optimized from the stand point of a limited total layer thickness in order to obtain the highest possible total transmission of the interference filter structure 2. Therefore, the layer thickness d of the individual interference filters 21, 22 and 23 was specified at less than 4 μm; preferably, 3000 nm≦d≦3500 nm.

The interference filters 21, 22 and 23 calculated by computer-assisted optimization (of the transmission functions required for the approximation of the normal spectral function of the eye) have between 30 and 40 layers. In the example shown in FIGS. 7a to 7c, the X-filter 35, Y-filter 37 and Z-filter 34 contain alternating layers of $TiO_2$ and $SiO_2$.

The interference filters 21, 22 and 23 calculated in this way can be arranged directly on the Si diodes of the sensor chip 1 by means of plasma-assisted coating (after applying a passivation coat) or, in order to avoid wasting valuable semiconductor material when layer tolerances are not met for the complicated interference filter structure 2, can also be applied to a glass substrate or produced by lift-off techniques and subsequently adjusted over the silicon chip.

Further remarks are addressed to the achievable accuracy of the color measurement for a tolerance of the layer thicknesses of less than 2% to be adhered to according to the invention. It was discovered that a varied layer thickness on this order of magnitude causes substantially only a displacement of the theoretically calculated filter function by a maximum of ±12 nm (at 600 nm). This displacement due to variances in layer thickness was shown additionally in FIG. 2 as a dashed line for the X-filter function in order to illustrate this effect with a layer thickness deviation of the interference filter 21.

In the following remarks, the conversion of the measurement values of the three-range photosensor into a normalized CIE color space is always assumed. An overview of the characteristics of CIE color spaces is offered in ISO definitions 7724 (or DIN 5033). Without limiting application of the invention with other CIE color spaces, the LAB color space is used for error assessment. It will be noted that any meaningful normalizing of the color values as in the XYZ space is impossible in the CIELAB color space due to nonlinearity.

In order to show a self-luminous object, the luminance of the object with respect to the background luminance is needed. However, without additional information it is difficult to provide a representative value for the luminance. Often, for this reason, only reflected and transmitted color stimuli are assumed. Self-luminous color stimuli are therefore advantageously reinterpreted as body colors, e.g., in that their emission spectrum is scaled to values of ≧1, and are accordingly interpreted as the transmission spectrum of an equivalent filter.

A scaling, i.e., an adjustment of the sensor channels to one another (i.e., a white adjustment of the signals/measurement values of the partial surfaces 11 of the three-channel photosensor to the normal spectral functions of the human eye) is, of course, indispensable. Aside from this scaling, no correction of the measurement values should be required under normal conditions.

FIRST EXAMPLE

A narrowband color stimulus can be simulated as a spectral bandpass interference filter, assuming a typical measure for the spectral bandwidth of a conventional interference filter of 15 nm.

Figure 8A:
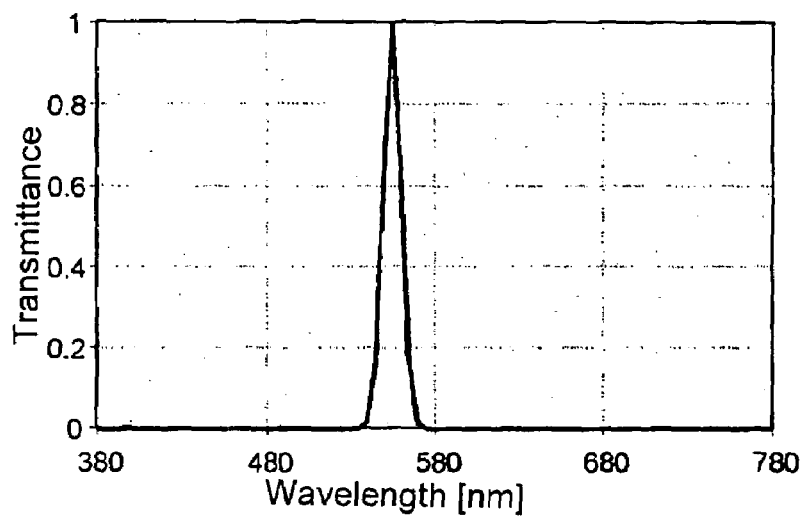
FIG. 8a shows the spectral transmission (or reflectance) of a narrowband model target with 15 nm spectral width and 1/e fall-off for a centroid wavelength of 555 nm.

FIG. 8a shows the spectral transmission (or reflectance) of an object of the kind mentioned above for a centroid wavelength of 555 nm. For a model target of this kind, the transmittance has a spectral width of 15 nm and a 1/e fall-off and is examined with variable centroid wavelength. Compared to a reference position of 555 nm, the filter curve is shifted from −12 nm to +12 nm in steps of 0.5 nm for error estimation and, in so doing, is determined for every displacement ΔE of the emission spectrum of the reference color and measured color in the CIELAB space, specifically as a function of the centroid wavelength of the reference transmission. The maximum value of ΔE over all centroid wavelengths was plotted as a function of the filter curve displacement in FIG. 8b.

Figure 8B:
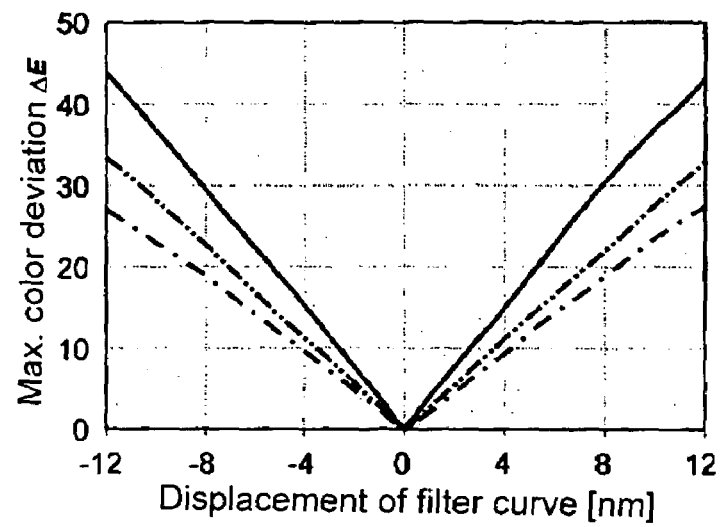
Figure 8C:
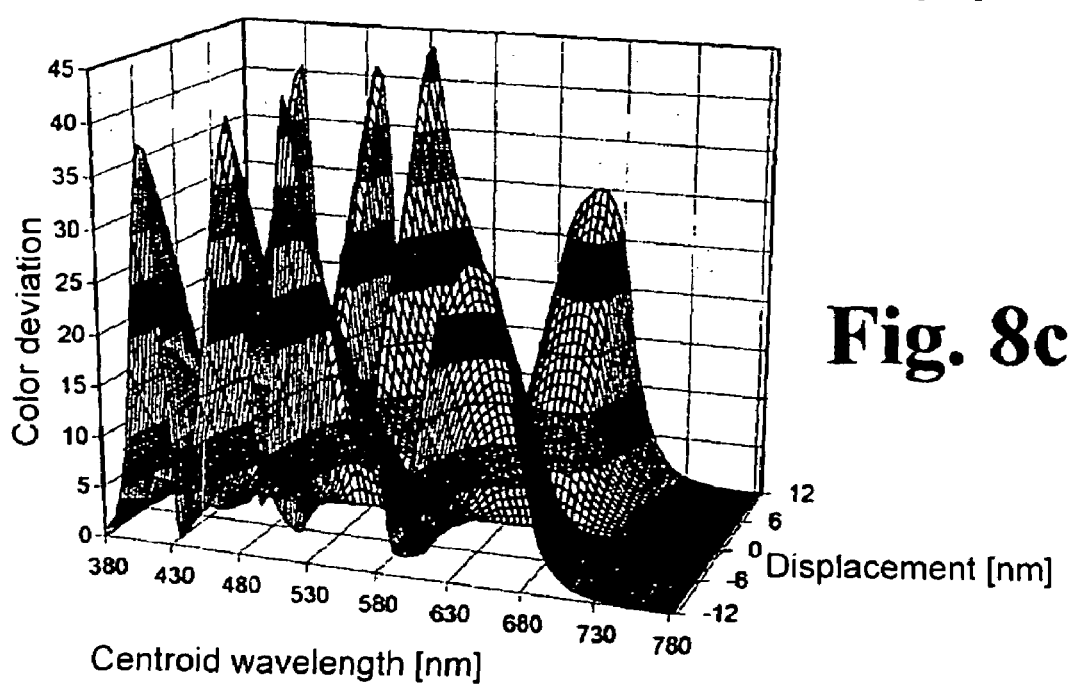

The overall results of the error calculation are illustrated in FIG. 8c as a function of the centroid wavelength and of the displacement of the filter function of the model target in the CIELAB space for the case where only the X-filter function was shifted.

As a result, the measured color deviation for every centroid wavelength is approximately proportional to the amount of the filter curve displacement. Results of equivalent quality are given for the Y- and Z-displacements. Local maxima of the color deviations which are comparable in order of magnitude with the absolute maximum have their centroid wavelength approximately at the reversal points of the filter function. This statement applies to transmitting and reflecting objects, wherein maximum brightness was assumed since the CIELAB space values greater brightness at a greater color distance.

SECOND EXAMPLE

Figure 9A:
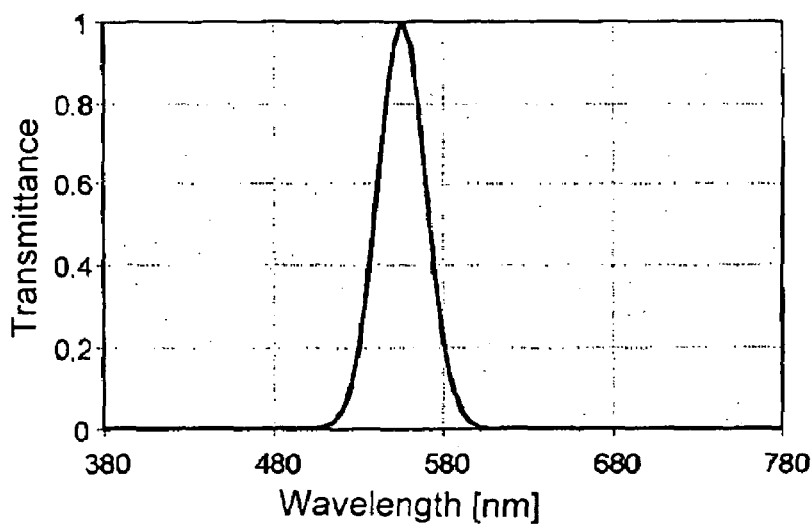
FIG. 9a shows the spectral transmission (or reflectance) of a model target with 40 nm spectral width and 1/e fall-off for the centroid wavelength of 555 nm.

LEDs can be simulated by providing a transmission filter with a filter width of 40 nm because the spectral behavior of typical LEDs can be closely approximated in this way. Accordingly, an object with corresponding transmission is taken as a starting point by way of substitution. The results for such a model target with a spectral width of 40 nm are very similar to those of the filter function with a bandwidth of 15 nm as can be seen from FIG. 9a. Thus it can be assumed that the color shift—at least in the spectral interval lying therebetween—is almost independent from the spectral width of the model target and is practically linear to the displacement of the X-, Y- or Z-filter curve with a given test object. Therefore, it is possible to calculate back from given color measurement errors to the secondary tolerances in a simple manner, since it is possible to work within the linear approximation.

Figure 9B:
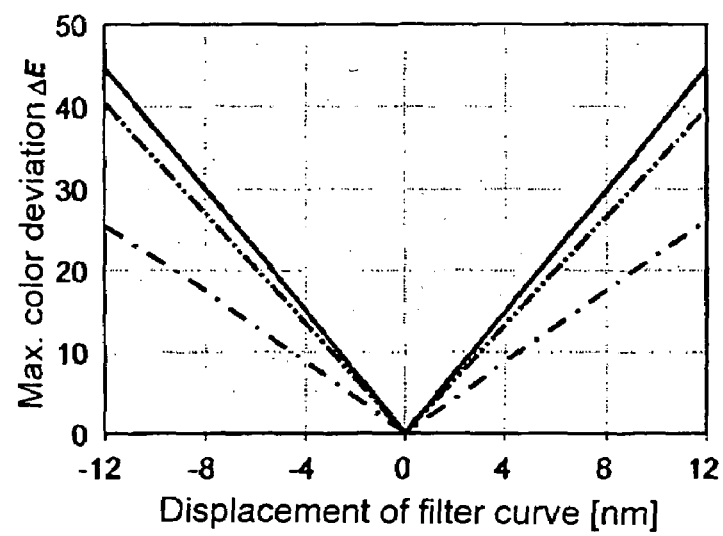
Figure 9C:
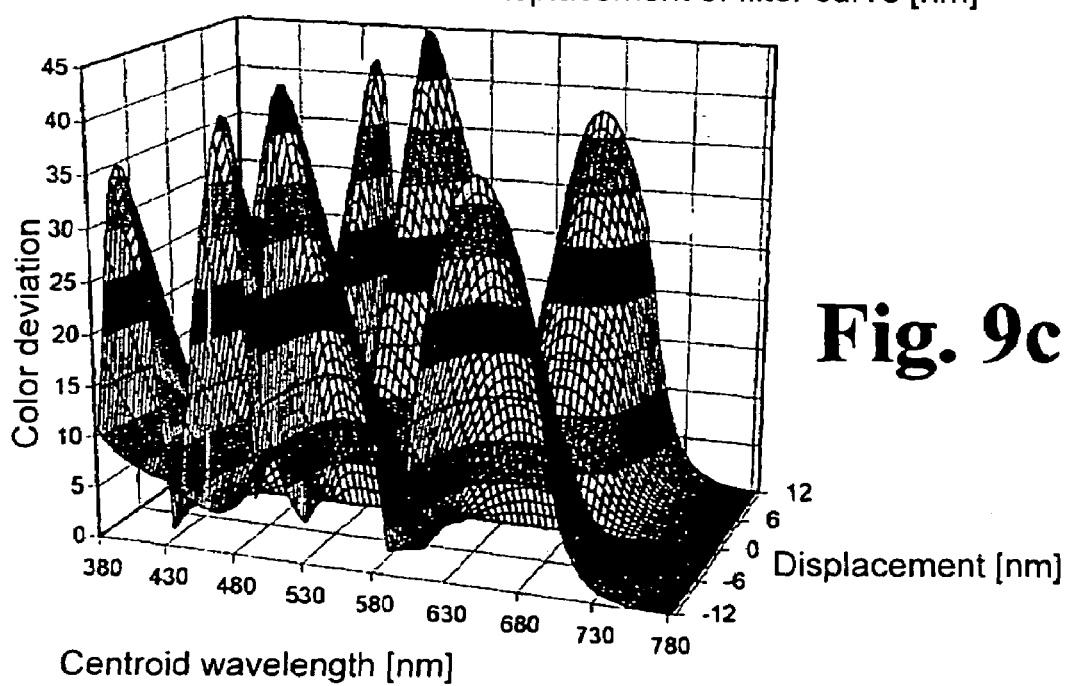

With a thickness tolerance of ±2% per layer of the filter system, a maximum curve displacement of about ±12 nm occurs as given by variational calculations. With a displacement of this type, clearly noticeable color deviations can be measured as is shown in FIGS. 8b and 9b. In order to be able to measure narrowband color stimuli with high accuracy, it would be necessary to reduce the manufacturing tolerances by a factor of about 10. However, since this requirement is unrealistic, linear correction (local matrixing, if possible) is carried out when the goal is a highly precise color measurement.

THIRD EXAMPLE

With standardized test colors, the spectral reflectance can often be approximated by a rising ramp function, this ramp function being characterized by an interval with constant minimal reflectance, a following interval with a positive rise, and a subsequent interval with constant maximum reflectance.

Figure 10A:
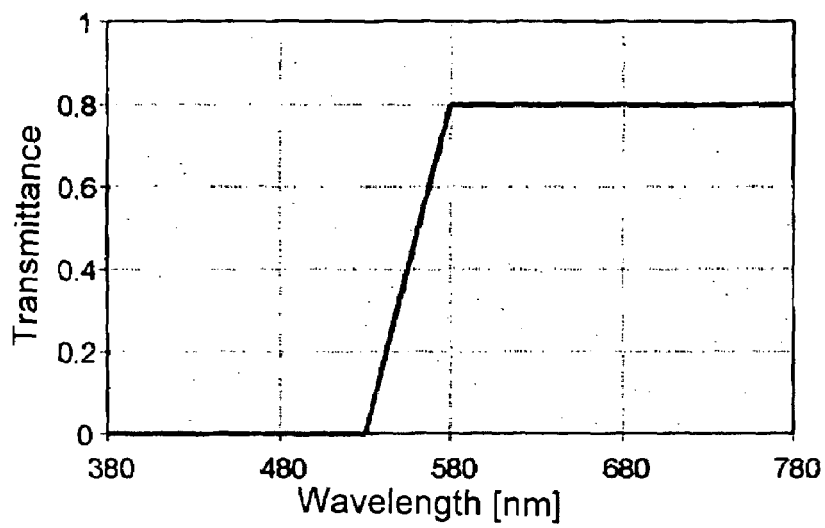
FIG. 10a shows the reflectance of a model target with ramp-shaped reflectance curve with a width of the transition region of 50 nm.

In this third example, it is assumed, using the standard illuminant D65, that there is no correction of measurement values aside from scaling. The transition area of the ramp function has a width of 50 nm and its center position (hereinafter: ramp position) which is shown as 555 nm in FIG. 10a varies over the entire visible spectrum.

Figure 10B:
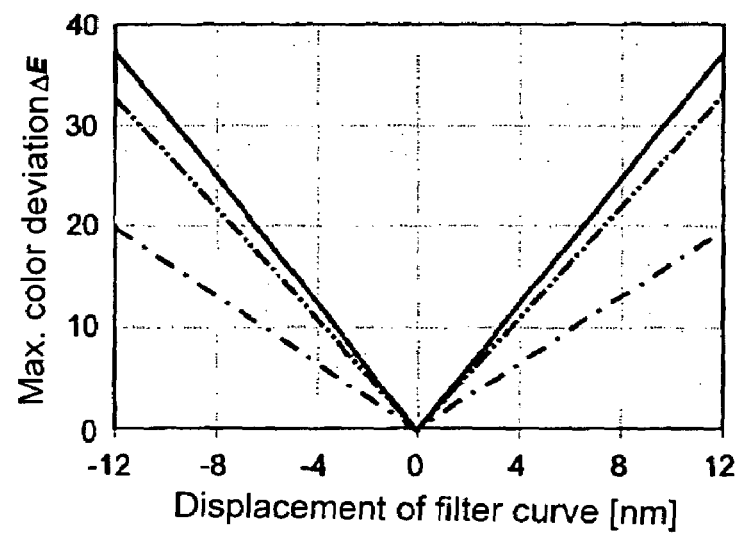
FIG. 10b shows the maximum color deviation for model targets according to FIG. 10a as a function of the displacement of the X-filter curve.
Figure 10C:
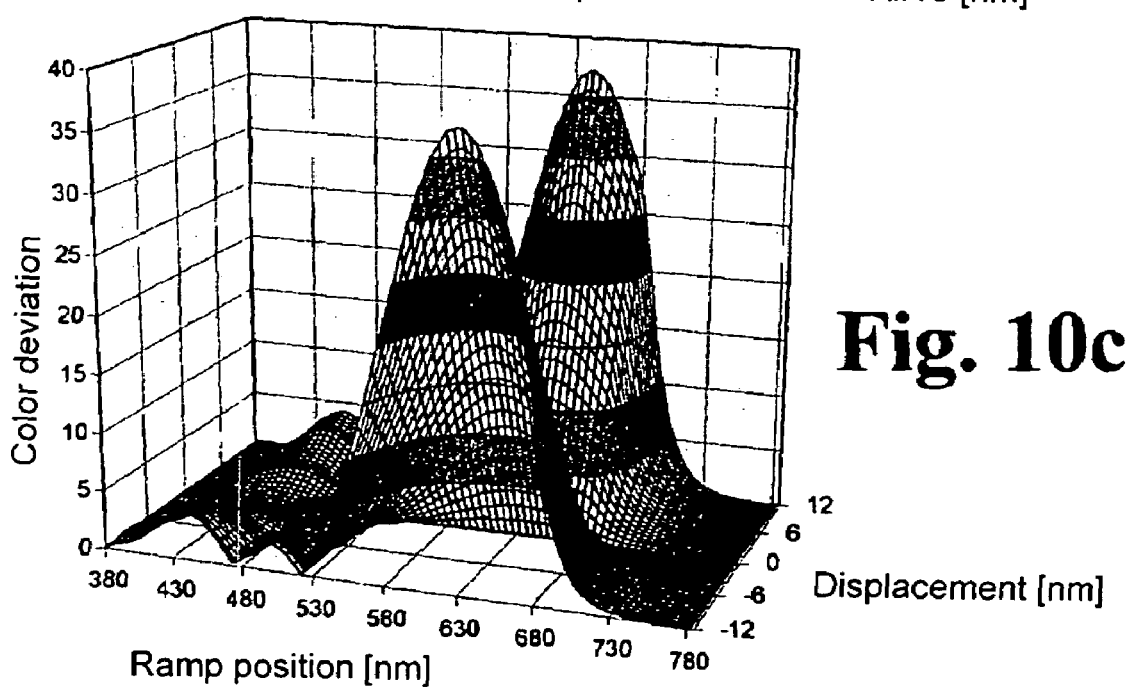
FIG. 10c shows the total results of the error calculation with displacement of the X-filter function for targets.

Once again, there is a maximum color deviation ΔE in the CIELAB color space with a displacement of the X-, Y- and Z-filter curves. In contrast to the narrowband color stimuli, there is only a clear maximum of the color deviation at about 630 nm for every X-filter displacement as can be seen in FIG. 10b. With Y-filter displacement, the maximum is 605 nm and with Z-filter displacement the maximum is 475 nm (not shown separately). This corresponds again to the reversal points of the falling edges of the ideal filter curves (from FIG. 2). With respect to the X-filter, there is a matching maximum value only toward the falling flank of the X-filter on the right as can be seen from FIG. 10c.

On the whole, the color deviation is substantially smaller than with narrowband color stimuli.

FOURTH EXAMPLE

Figure 11A:
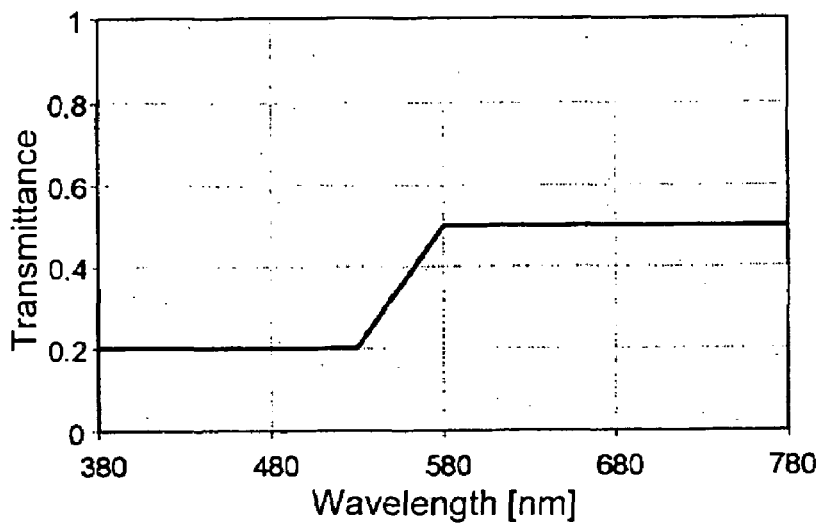
FIG. 11a shows the reflectance of a model target with ramp-shaped reflectance curve with a width of the transition area of 50 nm at a lower color contrast.
Figure 11B:
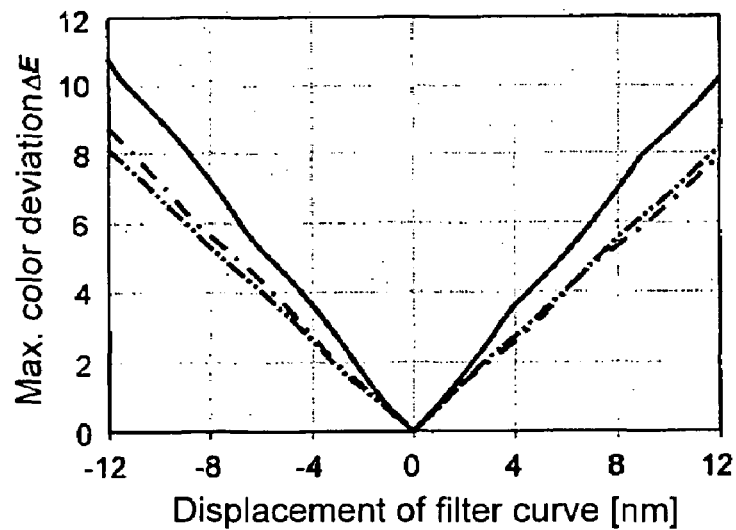
FIG. 11b shows the maximum color deviation for model targets according to FIG. 11a as a function of the displacement of the X-filter curve.
Figure 11C:
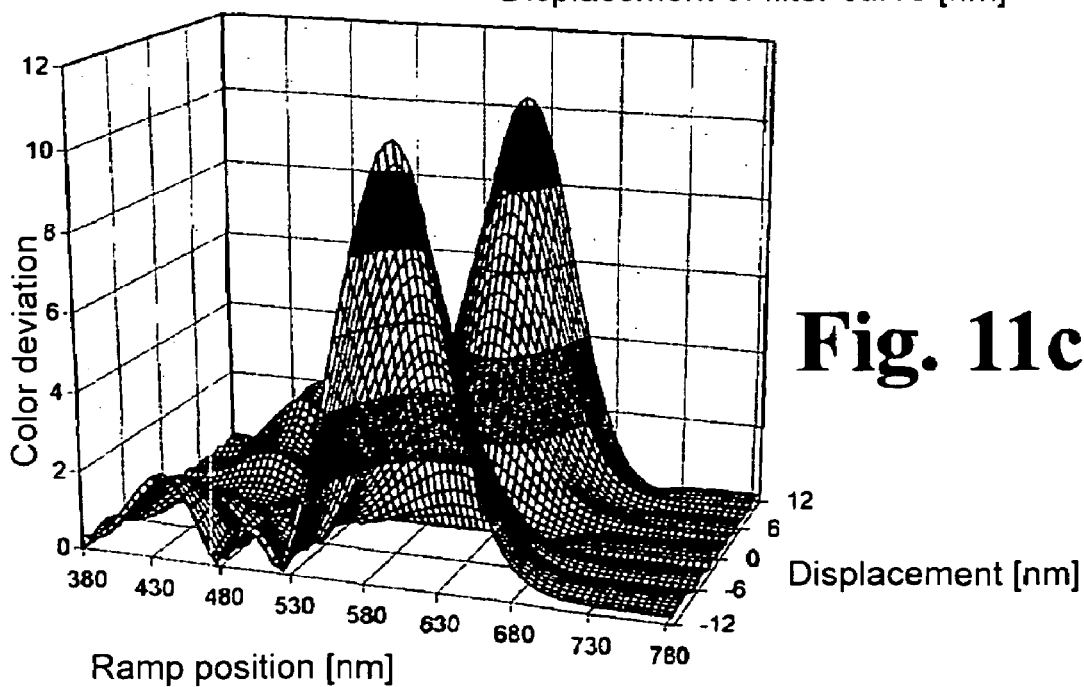

As a further example, a flatter ramp function (low color contrast) is analyzed according to FIG. 11a in that the ramp position once again varies over the entire visible spectrum with a transition area of 50 nm. In this case, the maximum color deviation ΔE in the CIELAB space is wherein the response-adapted color deviations are appreciably reduced due to the reduced color saturation according to FIG. 11b. FIG. 11c shows approximately the same qualitative behavior as FIG. 10c, but lower error amounts.

Thus it may be concluded that the sensed color deviations decrease with increasing bandwidth and decreasing saturation.

In the relevant range (±12 nm) of occurring displacements of the ideal filter function which must be included in calculations due to production-related deviations in the layer thickness of the interference filters 21, 22 and 23 from the theoretically calculated layer thickness d, a linear dependency can be assumed between filter curve displacement and color deviation. This results in the possibility of limiting to a linear (differential) tolerance calculation insofar as this is necessary by reason of the required accuracy of the color measurement.

In the examples above, the expected measurement errors were analyzed with reference to selected reflectance and transmission curves. Thus the question of which color stimulus function leads to maximum measurement errors (critical reflectance curve) has not yet been answered. However, a true worst-case scenario which is not dependent on the application is only possible on the basis of the critical color stimuli. The theory behind this is demanding and will only be roughly outlined in the following. The following equation can be given for the displacement ΔE of a color value in the CIELAB space:

$$\Delta E = \sqrt{(\Delta L^*)^2 + (\Delta a^*)^2 + (\Delta b^*)^2} \quad (1)$$

with deviations $\Delta L^*$, $\Delta a^*$, $\Delta b^*$ of the color coordinates caused by erroneous spectral sensor responses. Let it be assumed that all deviations from the ideal state are differentially small, so that there is linear error propagation. Let it further be assumed that the errors of the spectral sensor responses can be described by a reasonable number of curve parameters $t_1, t_2, \ldots, t_n$. The three parameters (curve displacements) used so far are sufficient for the time being when the transmission curves of the filters are not significantly disturbed by other manufacturing errors (apart from the layer thickness). Under these assumptions, it follows from equation (1) that:

$$\Delta E = \sqrt{\sum_{k=1}^{n}\left(\left(\frac{\partial L^*}{\partial t_k}\right)^2 + \left(\frac{\partial a^*}{\partial t_k}\right)^2 + \left(\frac{\partial b^*}{\partial t_k}\right)^2\right)(\Delta t_k)^2} \quad (2)$$

A maximum displacement ΔE can only occur when all individual errors $\Delta t_k$ (assuming that the individual errors are independent from one another) take on their maximum value:

$$\Delta E_{\max} = \sqrt{\sum_{k=1}^{n}\left(\left(\frac{\partial L^*}{\partial t_k}\right)^2 + \left(\frac{\partial a^*}{\partial t_k}\right)^2 + \left(\frac{\partial b^*}{\partial t_k}\right)^2\right)(\Delta t_{k,\max})^2} \quad (3)$$

The CIELAB color coordinates are differentiable functions of the standard color values X, Y, Z. Let $X = X_1$, $Y = X_2$, $Z = X_3$ by way of exception, then it follows from equation (3) that:

$$\Delta E_{\max} = \sqrt{\sum_{k=1}^{n}\sum_{j=1}^{3}\left(\left(\frac{\partial L^*}{\partial X_j}\right)^2 + \left(\frac{\partial a^*}{\partial X_j}\right)^2 + \left(\frac{\partial b^*}{\partial X_j}\right)^2\right)\left(\frac{\partial X_j}{\partial t_k}\Delta t_{k,\max}\right)^2} \quad (4)$$

In this formula, only the terms $\partial X_j / \partial X_k$ are unknown. With standard spectral values $\bar{x} = \bar{x}_1$, $\bar{y} = \bar{x}_2$, $\bar{z} = \bar{x}_3$ and the color stimulus function $\varphi$:

$$\frac{\partial X_j}{\partial t_k} = \int_{380nm}^{780nm} \varphi(\lambda) \frac{\partial x_j(\lambda, t_1, \ldots, t_n)}{\partial t_k} d\lambda, \quad (5)$$

$$\forall k \in \{1, \ldots, n\} \quad \forall j \in \{1, 2, 3\}.$$

The standard spectral value of $\bar{x}_j$ is arrived at by multiplication from the filter transmission $T_j$ (reference value) and the base sensitivity S of the sensor. For body colors, $\varphi$ can be the product of the light source spectrum $\varphi_B$ and the spectral reflectance $\beta$. It follows (Equation 5) that:

$$\frac{\partial X_j}{\partial t_k} = \int_{380nm}^{780nm} \beta(\lambda)\varphi_B(\lambda)S(\lambda) \frac{\partial x_j(\lambda, t_1, \ldots, t_n)}{\partial t_k} d\lambda, \quad (6)$$

$$\forall k \in \{1, \ldots, n\} \quad \forall j \in \{1, 2, 3\}.$$

A function $\beta(\lambda)$ must now be found such that the right side of Equation (4) is maximized by means of Equation (6). Since $0 \leq \beta(\lambda) \leq 1$, a solution to this variational problem exists.

The solution consists in discretizing the sought for function β by substituting the approximation sum for the integral in Equation (6). The variational problem is accordingly changed into a nonlinear optimization problem with, e.g., 81 free parameters (with a distance of 5 nm between reference points). Without a priori knowledge, however, such a problem can only be solved locally by iteration methods. Thus it remains uncertain whether or not one of the local solutions concurs with the global optimum. However, it can be discerned that a critical reflectance curve does not result for the model functions above (narrowband and ramp-shaped color stimuli) or simple combinations thereof.

In the preceding, the measurement results of a three-range sensor according to the invention which meets the requirements described above were simulated with reference to test color stimuli that were generated by a number of model functions (model targets) of practical relevance. Each of these test color stimuli contains a free parameter which was varied practically continuously (centroid wavelength or ramp position).

The simulation and colorimetric evaluation of the measurement results with variation of suitably selected model parameters was used as a basic method. This centered around error analysis with variation (deviations caused by production) of the filter functions, not the correction of systematic measurement errors.

With regard to the systematic measurement errors of the sensor according to the invention, it should be briefly noted that under unfavorable circumstances these systematic errors are too high by an order of magnitude for a precise measurement of color values (true color). This situation is altered only very slightly by reducing the layer thickness tolerances of the interference filter to about 1%. Therefore, an additional, unit-dependent correction of the measurement errors by software is useful. It should be noted that appreciable improvements are achieved already with a global linear correction (matrixing).

When a uniform and exact correction of the entire color space is required, a local linear correction may be resorted to if necessary. By this is meant breaking down the color space into tetrahedrons and applying a separate linear correction to each tetrahedron, wherein constant transition conditions must be maintained at the interfaces or boundary surfaces. However, this (pessimistic) approach is significant only for very demanding color measurement tasks, i.e., for output of exact tristimulus values with approximation of the XYZ-curves.

However, when directly compared to the "old" filter functions (red, green and blue bandpasses) of three-range sensors, simulations of the effects of color displacements in the filter functions X, Y, Z of the interference filters 21, 22 and 23 according to the invention show that even without measurement value correction the photosensor, according to the invention, for color measurement leads to appreciably fewer measurement errors than previous color sensors with conventional RGB filter systems. For example, when the color deviation with conventional filters is calculated in the same manner, the results obtained have appreciably more maximum deviations (FIGS. 12*a* and 12*b* compared to the results according to the invention shown in FIGS. 8*b* and 8*c*).

Figure 12A:
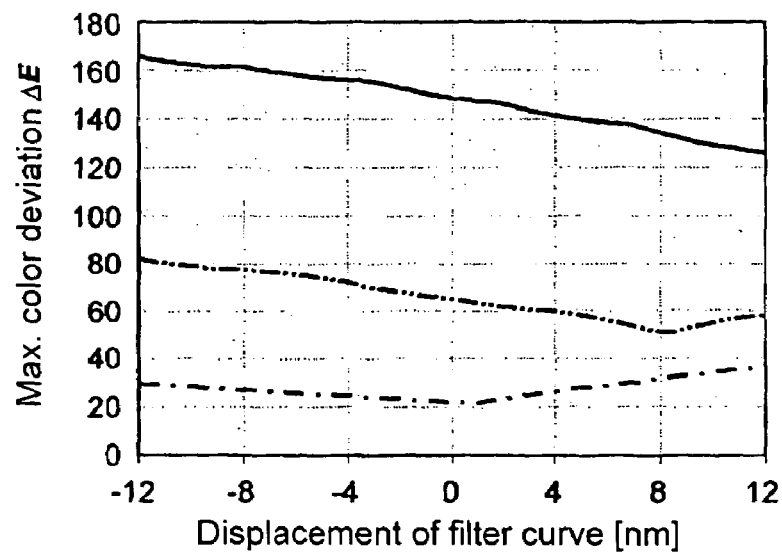
FIG. 12a shows the maximum color deviation for color stimuli with a width of 15 nm as a function of the displacement of the X-filter curve, determined for conventional sensors with three-bandpass filter system (MSC3 sensor manufactured by MAZeT, Germany)
Figure 12B:
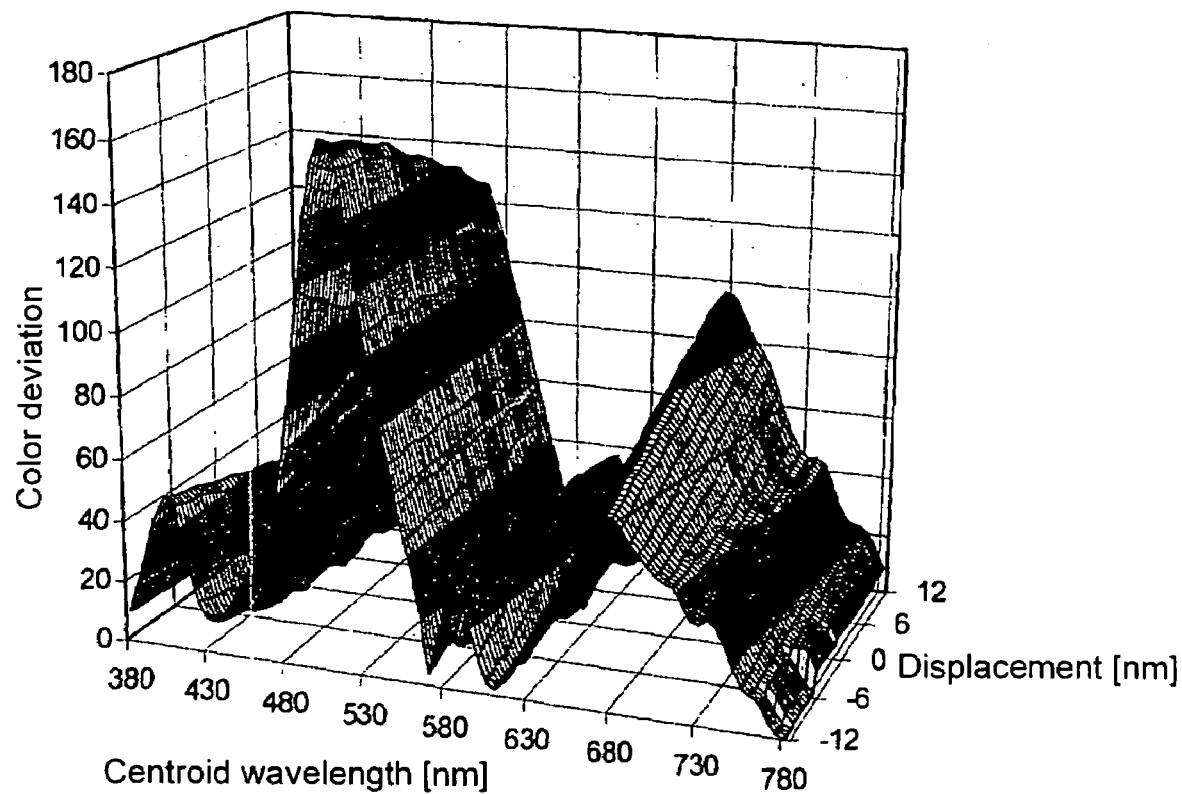
FIG. 12b shows the total results of the error calculation with displacement of the X-filter function for a spectral width of 15 nm of the color stimulus (according to FIG. 8a), determined for conventional sensors with a three-bandpass-filter system (MSC3 sensors).

It can be seen from FIG. 12*a* that the maximum errors in previous filter variants exceed those of the solution according to the invention approximately by a factor of 4. But a comparison of FIG. 12*b* and FIG. 8*c* is even more illuminating. While an error of 20 is exceeded only for extreme tolerances and only in a relatively small range of center wavelengths for the relevant narrowband stimuli with the new filter curves, the errors in the previous filter curves drop below this value only at about 580 m and 625 nm in very small frequency intervals. Also, the maximum deviations of the new filter variants which occur only in eight specific measurement situations (displacement, wavelength) are almost always substantially exceeded for narrowband stimuli. Although it is difficult to draw general quantitative conclusions because of the infinite variety of possible spectral stimuli, a clear leap in quality may nevertheless be achieved with the color sensor according to the invention. The local linear correction is capable of even further development and can be even more in-depth in order to make sensor specifications with peak parameters in a large number of applications.

Based on the model color stimuli selected above as well as on additional model color stimuli, simulations can be used to understand how the quality of the measurement results can be improved by global linear correction. The optimization criterion must be carefully determined for this purpose based on the measurement tasks to be accomplished.

However, the previous results already clearly show the adequacy of a linear approach for the individual errors and linear superposition.

Using the linear approach which has been substantiated in this way, it is possible to calculate the maximum manufacturing tolerances for the filter systems from the given maximum measurement errors in order to approximate the normal spectral function of the human eye and to make adjustments in production.

While the foregoing description and drawings represent the present invention, it will be obvious to those skilled in the art that various changes may be made therein without departing from the true spirit and scope of the present invention.

REFERENCE NUMBERS

1 sensor chip
11 partial surfaces
12 triple element
2 interference filter structure
21 interference filter (X)
22 interference filter (Y)
23 interference filter (Z)
24 webs
3 housing
31 inlet window
32 infrared filter
4 connection electrodes
41 cathode
42 anodes
S base sensitivity
X, Y, Z filter functions/filter characteristics

What is claimed is:

1. A photosensor for color measurement based on three spectral components comprising:
   a sensor chip having at least three partial surfaces for detecting the three spectral components;
   an interference filter structure of three different alternating multi-layer systems of silicon dioxide and titanium dioxide for selective transmission of incident light into said different partial surfaces of the sensor chip;
   said partial surfaces providing measurement values in response to said selectively transmitted incident light;

said three partial surfaces covered by different said multilayer systems of said filter structure being adapted to the spectral characteristic of the human eye;

said partial surfaces being arranged so as to be distributed in a circle sector-shaped manner around a central point with passive webs located therebetween; and each interference filter having a different overlapping transmission function over the wavelength of the light to be measured spectrally being adapted to the response of the human eye in such a way that the product of the base sensitivity curve of the photosensor and said transmission function of the interference filter is proportional to the normal spectral sensitivity curve of the human eye for one of the relevant coordinates of the color space, so that the passed spectral components generate measurement values in said three partial surfaces, which measurement values can be converted into spectral color values with simple scaling relative to one another.

2. The photosensor according to claim 1, wherein the transmission characteristic for each partial surface of the sensor chip having different sensitivities is produced as a computer-simulated alternating layer system with different layer thicknesses of $TiO_2$ and $SiO_2$ with a tolerance of the layer thicknesses of at most 2%.

3. The photosensor according to claim 2, wherein an arrangement is provided for linear correction of the measurement values put out by the partial surfaces to compensate for deviations in layer thickness caused by manufacture.

4. The photosensor according to claim 3, wherein the arrangement for linear correction of the output measurement values involves non-local or global matrixing.

5. The photosensor according to claim 3, wherein the arrangement for linear correction of the output measurement values involves a local matrixing for the selected color space.

6. The photosensor according to claim 1, wherein the interference filters are arranged directly on semiconductor diodes of the sensor chip.

7. The photosensor according to claim 6, wherein the interference filters are arranged directly on silicon diodes of the sensor chip.

8. The photosensor according to claim 7, wherein the interference filters are arranged on Si diodes which were produced by PIN diode technology specially adapted for the visual spectral region.

9. The photosensor according to claim 7, wherein the interference filters are arranged on Si diodes which were produced by CMOS technology specially adapted for the visual spectral region.

10. The photosensor according to claim 6, wherein the interference filters are arranged directly on a sensor chip with germanium diodes.

11. The photosensor according to claim 6, wherein the interference filters are arranged directly on a sensor chip with diodes based on InGaAs.

12. The photosensor according to claim 1, wherein the interference filters are arranged over the semiconductor diodes of the sensor chip on a separate glass plate.

13. The photosensor according to claim 1, wherein the partial surfaces on the sensor chip which are covered with said interference filters and have different sensitivity are shaped as thirds of a circle area and are arranged around a central point.

14. The photosensor according to claim 1, wherein the partial surfaces on the sensor chip which are covered by said interference filters and have different sensitivities are arranged around a central point as sectors of a circle area with different surface contents, wherein the different surface contents are adapted in such a way that a lower base sensitivity of one partial surface which comes about because of limited wavelength transmission of the respective interference filter is compensated by a correspondingly greater surface content of the partial surface of the photosensor.

15. The photosensor according to claim 1, wherein the partial surfaces on the sensor chip which have different sensitivities because of said interference filters are arranged around a central point in the shape of rhombuses with a 120-degree angle, so that they form a regular hexagon as a tricolor segment.

16. The photosensor according to claim 15, wherein the tricolor segments are arranged on the sensor chip so as to be uniformly distributed around a plurality of central points with identical webs, so that the tricolor segments are arranged in a honeycombed manner, wherein partial surfaces having identical spectral response do not share any adjacent lateral edges.

* * * * *